(12) United States Patent
Kruempelmann et al.

(10) Patent No.: US 8,060,832 B2
(45) Date of Patent: Nov. 15, 2011

(54) MANAGING INFORMATION DISPLAY

(75) Inventors: Marita Kruempelmann, Dielheim (DE); Hans-Jurgen Richstein, Rauenberg (DE); Andreas Heix, Heidelberg (DE)

(73) Assignee: SAP AG, Walldorf (DE)

( * ) Notice: Subject to any disclaimer, the term of this patent is extended or adjusted under 35 U.S.C. 154(b) by 975 days.

(21) Appl. No.: 11/700,373

(22) Filed: Jan. 30, 2007

(65) Prior Publication Data

US 2007/0136676 A1    Jun. 14, 2007

Related U.S. Application Data

(63) Continuation of application No. 10/307,891, filed on Dec. 2, 2002, now Pat. No. 7,191,410.

(51) Int. Cl.
*G06F 3/048*    (2006.01)
(52) U.S. Cl. ........ 715/765; 715/762; 715/853; 715/854; 345/619
(58) Field of Classification Search .................. 715/853, 715/854, 765
See application file for complete search history.

(56) References Cited

U.S. PATENT DOCUMENTS

| | | | | |
|---|---|---|---|---|
| 5,187,786 A * | 2/1993 | Densmore et al. | ................. | 707/3 |
| 5,423,034 A * | 6/1995 | Cohen-Levy et al. | .......... | 707/10 |
| 5,644,735 A * | 7/1997 | Luciw et al. | ................... | 715/708 |
| 5,838,317 A * | 11/1998 | Bolnick et al. | ................. | 715/764 |
| 5,940,831 A * | 8/1999 | Takano | .......................... | 707/10 |
| 5,986,667 A * | 11/1999 | Jevans | ........................... | 345/619 |
| 5,987,469 A * | 11/1999 | Lewis et al. | .................... | 707/102 |
| 6,008,806 A * | 12/1999 | Nakajima et al. | .............. | 715/744 |
| 6,020,888 A * | 2/2000 | Ho | ................................. | 715/835 |
| 6,148,311 A * | 11/2000 | Wishnie et al. | ................ | 715/205 |
| 6,407,752 B1 * | 6/2002 | Harnett | ........................ | 715/744 |
| 6,708,217 B1 * | 3/2004 | Colson et al. | ................. | 709/231 |
| 6,880,131 B1 * | 4/2005 | Nakazono et al. | ............ | 715/840 |
| 2001/0043238 A1 * | 11/2001 | Guerrero | ....................... | 345/853 |
| 2002/0075312 A1 * | 6/2002 | Amadio et al. | ................ | 345/764 |
| 2002/0143735 A1 * | 10/2002 | Ayi et al. | ............................ | 707/1 |
| 2004/0036718 A1 * | 2/2004 | Warren et al. | ................. | 345/744 |

OTHER PUBLICATIONS

Microsoft Windows XP Professional, Microsoft Windows, Copyright 1981-2001, Microsoft Corporation.*
Microsoft.com, Windows XP is Here!, Oct. 25, 2001, Microsoft Corporation, http://www.microsoft.com/presspass/press/2001/oct01/10-25xpoverallpr.mspx?pf=true.*

* cited by examiner

*Primary Examiner* — Alvin Tan
(74) *Attorney, Agent, or Firm* — Mintz, Levin, Cohn, Ferris, Glovsky & Popeo, P.C.

(57) ABSTRACT

Systems and methods for managing information display include the ability, at least in one implementation, to receive a message indicating that the information of a resource is to be displayed and to form a user interface for displaying the resource information by defining a pane in which to display the information and selecting a renderer operable to render the information in the pane.

20 Claims, 6 Drawing Sheets

FIG. 4

| NEW ▼ | EDIT ▼ | SEARCH ▼ | VIEW ▼ | ACTIONS ▼ | HELP | SORT BY [NAME ▼] ↑↓ |

PERSONAL DOCUMENTS

☐ JUNK
☑ THIS IS A TEST FOLDER FOR
  GENERAL PURPOSE USE.

☐ WHITEPAPERS
☑ THIS COLLECTION OF DOCUMENTS DESCRIBES
  THE OPERATION AND COMMISSIONING OF THE
  PLUMTREE PORTAL.

☐ DRAFTS
☑ THESE DOCUMENTS HAVE NOT
  YET BEEN RELEASED TO THE
  GENERAL PUBLIC

☐ COMPETITORS
☑ HERE IS INFORMATION CONCERNING
  COMPETITORS AND THEIR PRODUCTS.

| NAME | MODIFIED | SIZE |
|---|---|---|
| ☑ CALIFORNIA_CASUALTY_ROI_STUDY.PDF | 11 MAR 2002 16:38:30 GMT | 29116 BYTES |
| ☑ TODO.TXT | 11 MAR 2002 16:40:47 GMT | 34 BYTES |
| ☑ CSNS.DOC | 11 MAR 2002 16:39:10 GMT | 28822 BYTES |
| ☑ AMERICAN.JPG | 11 MAR 2002 16:37:25 GMT | 57509 BYTES |
| ☐ PAT1.PDF | 11 MAR 2002 16:39:52 GMT | 52013 BYTES |

1-10 11-20 > >> /20

MANAGING INFORMATION DISPLAY

CROSS-REFERENCED TO RELATED APPLICATION

This patent application is a continuation of U.S. patent application Ser. No. 10/307,891, filed on Dec. 2, 2002 now U.S. Pat. No. 7,191,410, the contents of which are hereby incorporated by reference.

BACKGROUND

The present application describes systems and techniques related to displaying information, for example, a system and method for managing information display.

A user interface offers a convenient way to quickly comprehend and move through resources in a repository. Typically, user interfaces use a logical structure such as a hierarchical tree to organize the information in the repository for presentation to the user. The user can then expand and collapse the tree to observe resources. Furthermore, the user can select a resource to obtain more information about it or specify that more or less information about a group of resources should be displayed. Additionally, in some user interfaces, resources are hidden if a user does not have permission to access them.

SUMMARY

The present application teaches managing information display. The determination could be based on a user role, a user viewing interest, and/or properties of a resource.

In one aspect, a method and system for managing information display include the ability to receive a message indicating that information of a resource is to be displayed and to form a user interface for displaying the resource information by defining a pane in which to display the information and selecting a renderer operable to render the information in the pane.

In additional aspects, a method and system include the ability to evaluate a property of a resource and a user context to select a renderer. In some aspects, evaluating a property of a resource comprises evaluating its location in a resource hierarchy. In particular aspects, evaluating a user context comprises evaluating a user role and a user viewing interest. In certain aspects, a user viewing interest includes modifying resource content.

In some aspects, a method and system include the ability to associate a resource with a resource class, the class specifying resource properties, to evaluate a property of the resource and a user context. In particular aspects, associating a resource with a resource class includes, in order of priority, evaluating parameters contained in a message to identify a resource class, examining parent resource type to identify a resource class, and using default system settings to identify a resource class.

In additional aspects, a resource comprises a plurality of resources, and a method and system include the ability to select a controller operable to define a layout for organizing navigation through the resources' information. In some aspects, selecting a controller comprises evaluating a property of the resources and a user context. In certain aspects, evaluating a property of resources and a user context includes associating the resources with a resource class, the class specifying resource properties. In particular aspects, associating resources with a resource class comprises, in order of priority, evaluating parameters contained in the message to identify a resource class, analyzing settings of a parent resource to identify a resource class, examining parent resource type to identify a resource class, and using default system settings to identify a resource class.

In certain aspects, a resource comprises a plurality of resources, and a system and method include the ability to select a renderer for organizing the display of the resources' information.

In some aspects, a system and method include the ability to modify characteristics associated with a resource, wherein a user interface is altered by the modification. In certain aspects, a user interface is altered by having a different renderer selected to render the information in a pane.

In particular aspects, a method and system include the ability to determine whether the resource has an associated action, to determine, if the resource has an associated action, a label for the action, and to render the label. In some aspects, the label comprises a link, a button, or a hover menu. In certain aspects, the method and system include the ability to detect an event related to selection of the action and to map the event to a command to perform the action. In some aspects, the method and system include the ability to generate a new message to display information of a resource when the action has been completed. In certain aspects, the method and system include the ability to modify the association between actions and resources so that the associated action is altered.

The present invention has a variety of features. For example, in certain embodiments, the invention allows information display to be determined dynamically. Thus, user interfaces do not have to be determined a priori, which should allow user interfaces to be readily modified. As a further example, in particular embodiments, the invention allows user interface configuration based on user role, user viewing interest, and/or resource properties. Thus, a user interface may be provided that is tailored to the user and/or resource. As a further example, in some embodiments, the invention provides a single point of entry for users across a wide variety of systems of an organization. Of course, some embodiments may possess none, one, some, or all of these features and/or additional features.

Details of one or more implementations are set forth in the accompanying drawings and the description below. Other features may be apparent from the description and drawings, and from the claims.

BRIEF DESCRIPTION OF THE DRAWINGS

These and other aspects will now be described in detail with reference to the following drawings:

FIG. 4 illustrates another embodiment of a user interface that may be generated by a display generator;

Like reference symbols in the various drawings indicate like elements.

DETAILED DESCRIPTION

The systems and techniques described herein relate to managing information display. In particular, user interfaces for displaying information of resources, which could include structured or unstructured documents, reports, presentations, may be managed based on resource properties, user role, and/or user viewing interest, the last two collectively referred to as user context.

Figure 1:
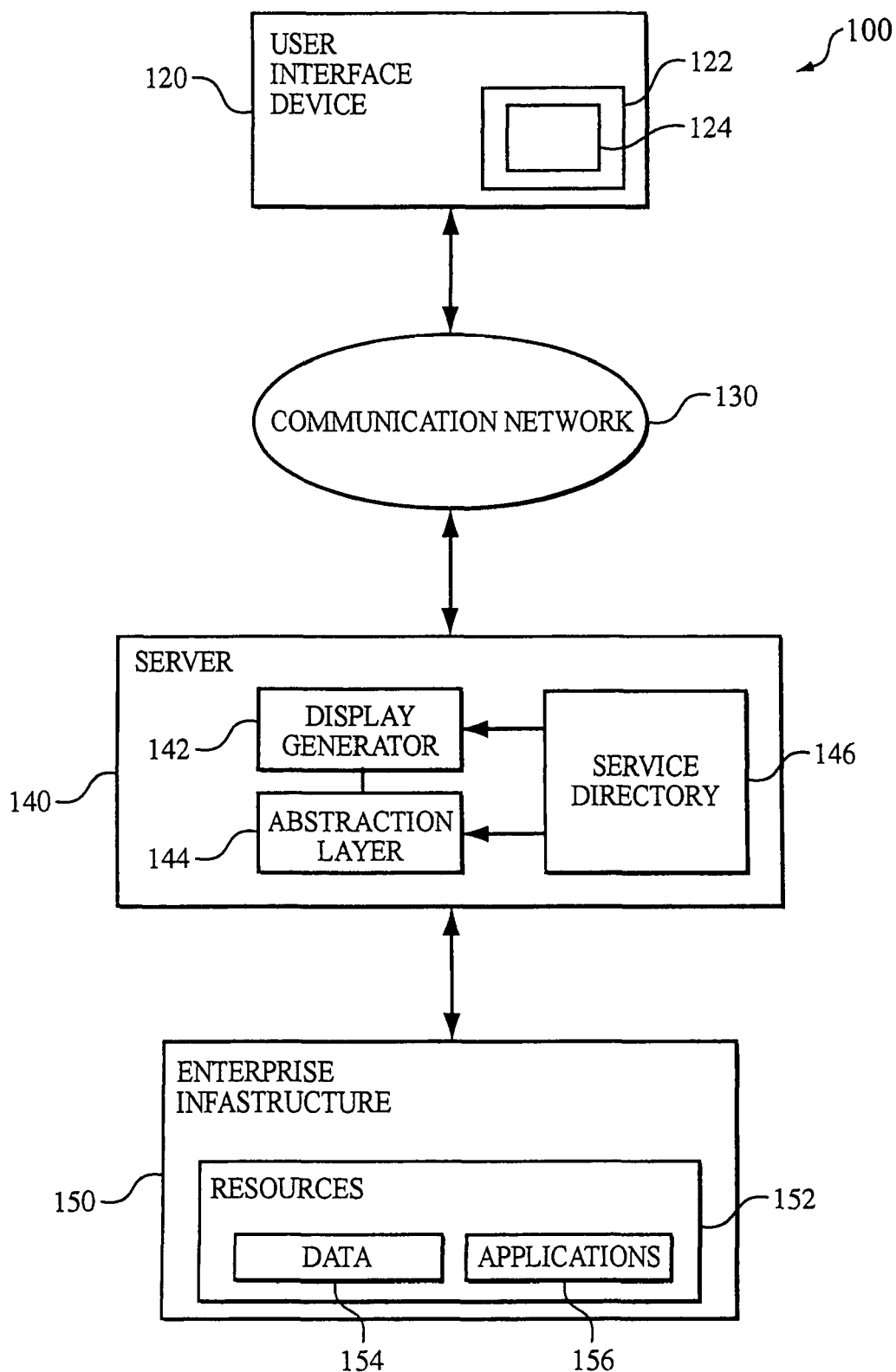
FIG. 1 illustrates a system for managing information display in accordance with one embodiment of the present invention.

FIG. 1 illustrates a system 100 for managing information display in accordance with one embodiment of the present invention. In general, system 100 includes a user interface device 120, a communication network 130, a server 140, and an enterprise infrastructure 150. Server 140 is operable to extract and format information from enterprise infrastructure 150, format it into a user interface, and send data representing the user interface through communication network 130 to user interface device 120. User interface device 120, in turn, is operable to display the user interface to a user of the device and send detected user input from the user to server 140, which is operable to process the user input. In particular embodiments, system 100 is a native Web infrastructure based on open standards, to allow access to information in a variety of formats.

In more detail, user interface device 120 includes a screen 122 that is operable to display a user interface 124. Screen 122 may be a cathode-ray-tube screen, a liquid-crystal-display screen, or any other appropriate type of device for displaying information. User interface 124 may be a graphics-based user interface, a text-based user interface, or any other appropriate type of format for presenting information. In particular embodiments, the user interface can receive input from a user, such as, for example, the selection of an action associated with a resource. User interface device 120 may also include any other appropriate type of devices for facilitating displaying information from server 140 or receiving user input. Such devices could include network interface devices, processing devices, memory devices, which could store the information and/or logical instructions for manipulating the information for display, and user input devices. In particular embodiments, user interface device 120 may operate as a client to server 140.

Communication network 130 may include any appropriate type of devices for relaying information between logical components. For example, communication network 130 may include routers, switches, bridges, repeaters, and/or transceivers. Furthermore, communication network may use wires, fiber-optics, wireless channels, or any other appropriate type of medium. Additionally, communication network 130 may send information using packet-switched and/or circuit switched techniques. In particular embodiments, communication network 130 is the Internet and, hence, operates according to Internet protocols.

Server 140 includes a display generator 142, an abstraction layer 144, and a service directory 146. In general, server 140 is a framework for information deployment. Server 140 may use any appropriate type of transport protocol, such as for example, HyperText Transport Protocol (HTTP) or Wireless Access Protocol (WAP), for sending information and any appropriate type of user interface generation language, such as, for example, HyperText Markup Language (HTML), Extensible Markup Language (XML), or Wireless Markup Language (WML), for generating a user interface.

In more detail, abstraction layer 144 is operable to extract, correlate, and/or understand the information and logic in enterprise infrastructure 150. In accomplishing this, abstraction layer 144 may aggregate and classify the information. For example, abstraction layer 144 may use metadata to categorize documents into multiple taxonomies, for browsing and/or retrieval. In particular embodiments, layer 144 stores pointers to documents in a folder hierarchy, which ensures nonredundant storage and allows access control to be tied to the roles of users. Service directory, in turn, 146 stores information regarding a user of system 100. For example, service directory 146 may store information regarding attributes that a user possesses for a certain role. For instance, a user that is a system administrator may be able to access and change all types of information in enterprise infrastructure 150, but a user that is a content provider may only be able to access and change certain types of information in enterprise infrastructure 150. Furthermore, service directory 146 could store information regarding personal preferences of a user. Display generator 142 is operable to determine how to present information to a user. To accomplish this, display generator 142 may, when determining how to display information, take into account: 1) a user's role, administrator, casual user, content provider, or otherwise; 2) a user's current viewing interest, searching for information, whether by key word, natural language, or otherwise, updating information content, modifying information structure, or otherwise; and/or 3) resource properties, the location of the information, type of information, content mime type, extension, and/or otherwise. For example, if a user is browsing through information, the display generator may provide a hierarchical view of the information and allow the user to "click-through" it, but if a user is searching for a specific piece of information, the display generator may provide a detailed searching tool, possibly with Boolean search logic. As another example, depending on the role that the user possesses, more or less information may be available to the user. Furthermore, display generator 200 is operable to receive user input from user interface device 120 and determine an appropriate response, ignore, execute function, update user interface, and/or otherwise.

Display generator 142, abstraction layer 144, and service directory 146 may include any appropriate type of volatile or non-volatile electromagnetic or optical device for storing information. Furthermore, display generator 142, abstraction layer 144, and service directory 146 may store information and/or logic for manipulating the information. Server 140 may itself include any other appropriate type of devices for assisting in retrieving, manipulating, and sending information. Such devices could include network interface devices, processing devices, and storage devices. In particular embodiments, server 140 may be a Java 2 Platform, Enterprise Edition (J2EE) Web server and may function as a portal.

Enterprise infrastructure 150 contains resources 152, which includes data 154 and applications 156. Data 154 could include folders, documents, files, databases, Web content, business analytics, or any other appropriate grouping of information, whether structure or unstructured. The information itself could be technical papers, presentations, drawings, calculation sheets, and/or on-line discussions, for example. Furthermore, information could include information about data. Applications 154, in turn, contain logic that implements business processes. Applications 154 may perform any appropriate function for a business process, such as, for example, order entry, order fulfillment, demand forecasting, supply chain management, enterprise resource management, and/or human resource management. Such applications are commonly provided by companies such as SAP, BAAN, Peoplesoft, and the like. The input to and/or output from an application, along with its functions, are also information that may be displayed in a user interface.

Enterprise infrastructure 150 may include any appropriate type of volatile or non-volatile electromagnetic or optical device for storing resources 152. Furthermore, enterprise infrastructure 150 may include any other appropriate type of devices for assisting in retrieving, manipulating, and sending information. Such devices could include network interface devices, processing devices, and storage devices.

In particular embodiments, server 140 delivers user-centric collaboration through unification, which allows data and relationships to be accessed and traversed through a virtual metadata layer. Unification provides contextual navigation that greatly reduces the time it takes to resolve an event of which a user becomes aware. It does this by breaking monolithic applications into building blocks that an organization can combine into elaborate solutions. In certain embodiments, unification is applicable to transaction and legacy systems. The transaction and legacy systems may be unified by unifiers from companies such as PeopleSoft, Siebel, Oracle, Baan, and SAP.

System 100 has a variety of technical features. For example, the system allows heterogeneous information in an information technology landscape to be displayed in a user interface, which assists in the implementation of collaborative business process by allowing users to analyze information from disparate systems. For instance, system 100 may provide users with the ability to navigate across components of applications, business intelligence sources, documents, and Web sites as if they were all part of one virtual application that is custom configured for the user. Moreover, the information may be organized and provided efficiently. As another example, the system allows information display to be determined dynamically. Thus, user interfaces do not have to be determined a priori, which should save administrative and coding time in developing user interfaces and should allow user interfaces to be readily modified. As a further example, the system allows user interface configuration based on user roles, user interest, and/or resource properties. Thus, the system may provide an appropriate set of information and/or controls based on the user's authorization. Furthermore, the system may provide an appropriate set of information and/or controls based on the user's current needs. Additionally, the system may provide an appropriate set of information and/or controls based on the information being examined. For instance, the system may only offer cursory information about data that an end user is browsing and/or a limited set of controls for observing the data, while offering a content administrator detailed information about the data and advanced functions for its viewing and manipulation, which could include editing, structuring, or any other appropriate function. In particular embodiments, a content manager's user interface could be "Explorer like," through folders and document lists. As another example, the system may provide different user interfaces for the same user who is browsing information in one instance and navigating through it in another instance. Browsing and navigating may provide the central user interface for gaining access to resources and manipulating them. As an additional example, system 100 may provide a single point of entry for users across a wide variety of systems of an organization.

In certain embodiments, abstraction layer 146 may also support collaboration, which provides a common, central place where distributed teams can work together for authoring and/or review purposes. To accomplish this, abstraction layer 146 may conform to the Web-Based Distributed Authoring and Versioning (WebDAV) standard for interfaces. Furthermore, collaboration may take one of two forms: synchronous or asynchronous. In synchronous collaborations, users share live information, online meetings and instant messaging providing two examples of synchronous collaborations. In asynchronous collaboration, users work together on a non-live basis, threaded discussions, document ratings, workflow, feedback, and shared folders providing examples of asynchronous collaboration. In some embodiments, collaboration extends beyond documents and other static information. For example, users could collaborate on user interfaces created by another user, adding comments, altering it, and/or syndicating it.

Figure 2:
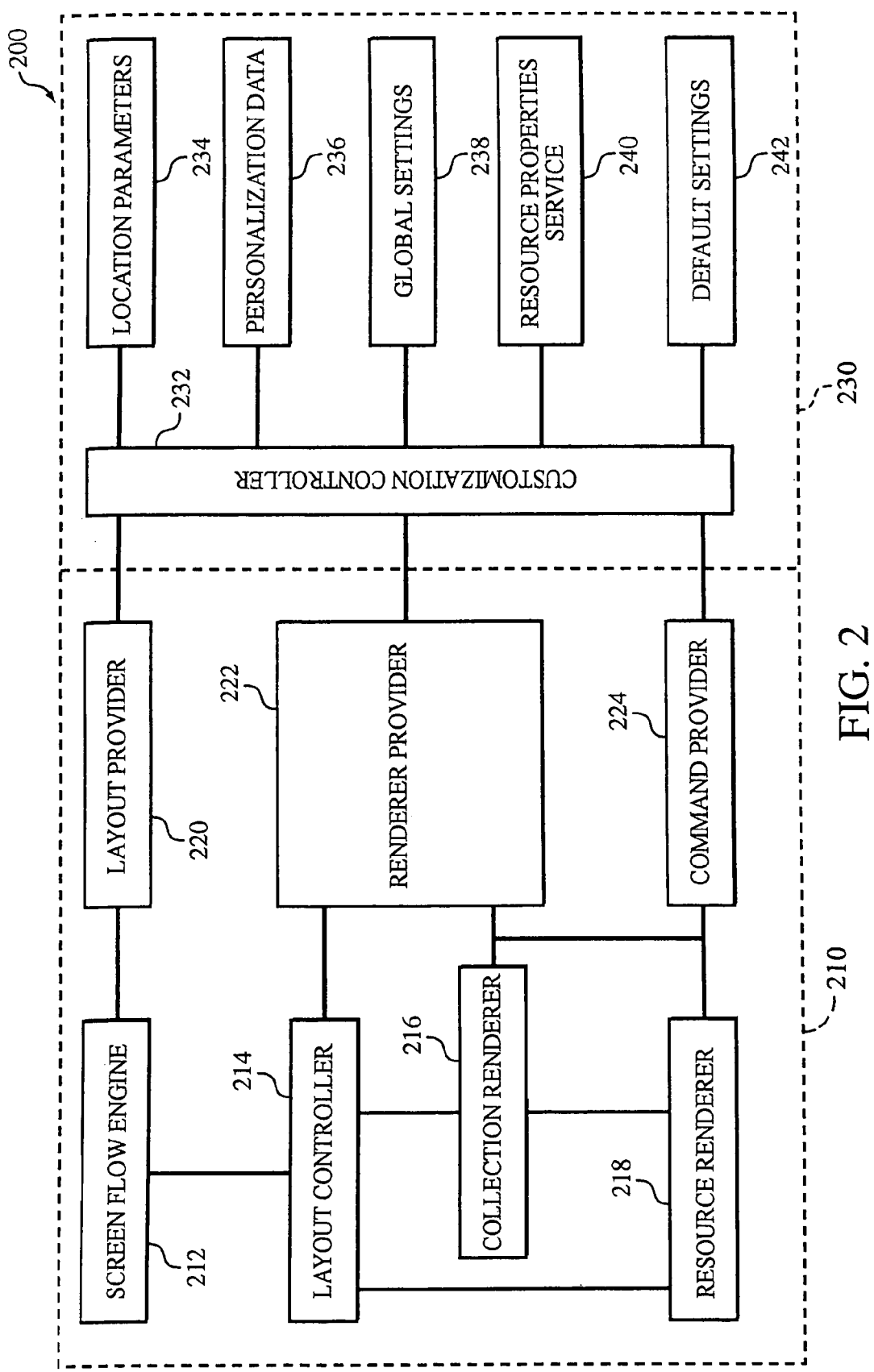
FIG. 2 is a block diagram illustrating one embodiment of a display generator for managing information display.

FIG. 2 is a block diagram illustrating one embodiment of a display generator 200 for managing information display. In general, display generator 200 includes a portion 210 for rendering a user interface at different levels according to resource properties, user role, and/or user viewing interest and a portion 230 for allowing user customization of the user interface. Display generator 200 may be used in system 100, for example.

Portion 210 includes a screen flow engine 212, a layout controller 214, a collection renderer 216, a resource renderer 218, a layout provider 220, a renderer provider 222, and a command provider 224. Layout controller 214, collection renderer 216, and resource renderer 218 are responsible for the layout and different levels of rendering within the user interface. Some configurations of the user interface may be valid for the whole company, while others may be valid for a user, on a folder level, or for any other appropriate classifier. Generator 200 may reuse layout controller 214, collection renderer 216, and/or resource renderer 218 in different formations of the user interface, and a user may modify one or more of these, allowing the user interface to be reconfigured.

In more detail, screen flow engine 212 is used as the outermost container for the user interface. Typically screen flow engine 212 contains only one layout controller, although it could contain multiple layout controllers in particular embodiments. In such cases, screen flow engine 212 could be a single composite control, one that may hold other controls. In particular embodiments, screen flow engine 212 is the entry point for a Web Definition Framework (WDF), a framework used to control screen flow logic in which controls and panes are the elements used to build up screens and to handle event driven navigations between the screens, to call a navigation user interface. Screen flow engine 212 supports dynamic rendering, rendering configured at runtime rather than at configuration time, by being pre-configured on the framework level and acting on behalf of any contained control. Furthermore, screen flow engine 212 consolidates parameters and is the anchor for dynamically extended screen flow definitions. The basic input to screen flow engine 212 is a resource, which may be a simple resource, a real collection (one having an resource identifier (RID), which must be unique within the system), a programmatically created, temporary collection (one not being persistent in the framework), or any other appropriate type of resource.

Layout controller 214 is used as the topmost exchangeable container to define different layouts for navigation through resources. Layout controller 214 may be responsible for the complete layout and rendering of the control, allowing the implementation to be more or less generic from that point on. Layout controller 214 may range from a simple, hardwired set of a number of links to a complete framework-like controller resembling the WDF architecture. The layout controller may be defined a priori, selectable, and/or user developed.

To provide a high level of customizability, system 200 may include a default set of layout controllers that will allow for the exchange of rendering components on different levels. Note that generator 200 may include several layout controllers, and a user may change the whole screen layout by choosing the appropriate layout controller. To select which layout controller will be the first and outermost layout controller when multiple layout controllers are being used, the corresponding class may be determined by looking up the needed information in the following priority: 1) evaluate parameters continued in the URL or the initiating event, which may be personal settings; 2) look up specific settings of the parent resource, folder settings, for example; 3) request class based on parent resource type; and 4) use default settings.

A layout controller may itself contain other layout controllers (for reuse reasons), because a layout controller may be just a composite control. The basic layout, however, is predefined by the main layout controller and is not typically customizable.

Collection renderer 216 is used within layout controller 214 and is responsible for rendering a list of resources. Collection renderer 216 controls the layout and functionality that does not belong to a single resource but to the whole list or some selected resources, and renders information pertaining to that list, such as, for example, checkboxes and functions for mass operations. Thus, it defines the basic structure for the resource list, such as, for example, a table, a grid, or other appropriate structure. The collection renderer may be defined a priori, selectable, and/or user developed.

Note that layout controller 214 may include several collection renderers. Also, like the top-level layout controller, which can be exchanged by the basic concept of the navigation user interface framework, a user may provide their own implementation for collection rendering. The selection of the necessary classes may be determined by the procedure mentioned above for the layout controller except for step two, because parent resources do not provide any information here.

Resource renderer 218 is used by collection renderer 216 to render the resource specific parts of a list, meaning information of the resource, which could include the information in a resource and/or information about the resource. As such, resource renderer 218 is responsible for the layout and functionality of a single resource's information. As a basic functionality, the resource renderer may be able to render a standalone component as a default representation. When called from a collection renderer, the resource renderer supports rendering of the available pieces of information, such as properties, actions, icons, and the like, each component being rendered into the superior structure. The default rendering of a resource property may be performed by standard property renderers. Resource renderer 218 may be defined a priori, selectable, and/or user developed. Note that layout controller 214 may include multiple resource renderers, and a user may control the rendering of a resource by choosing the appropriate resource renderer. Additionally, resource renderer 218 may include a property renderer, which is a helper class used within the resource renderer, and possibly elsewhere, to provide a consistent rendering for a property within the whole architecture.

Layout provider 220, renderer provider 222, and command provider 224 are responsible for the mapping from configuration parameters to concrete instances of classes. Command provider 224 provides a command class that encapsulates an action for a resource represented by one or more commands and the knowledge on how to present this action within the user interface, including the whole screen flow needed for this action. In particular embodiments, a command bundles a set of framework actions in a single class so that controls can carry out these framework actions with a single method call of the command. In certain embodiments, command provider 224 may provide a hierarchical list of commands. The commands could also encapsulate error handling and/or precondition checks. For the layout of actions, it has to be decided whether to use a link, a button, a hover menu, or other appropriate activating device. The behavior after a user has selected the action, however, may be the same, and some checks before rendering of the resource, like permissions or locking, may be done in the same way as well. This leads to user interface commands that do not care about the layout, the tasks of the resource renderer or the collection renderer, but encapsulate the needed labels, screen flow, and event encoding needed to get the mapping between event and user interface command with the commands needed to perform the action. In particular embodiments, for example, commands may be made more or less prominent depending on the tasks a user may perform. Layout provider 220 and renderer provider 222 may be factory design patterns that determine the necessary rendering classes based on user role, user viewing interest, and/or resource properties.

To accomplish their functions, layout provider 220, renderer provider 222, and command provider 224 use a customization controller 232, which is part of portion 230, to determine the necessary classes, rendering or command, based on user role, user viewing interest, and/or resource properties. Customization controller 232 receives a request for a certain parameter key and checks its configuration sources—location parameters 234, personalization data 236, global settings 238, resource properties service 240, and default settings 242, in the illustrated embodiment, for values of this key. It then returns the best fitting and highest in the hierarchy of configuration sources. Layout provider 220, renderer provider 222, and command provider 224 then use the returned value to identify the wanted class and return a new instance of that class.

User interface commands are used by the resource renderer to support the rendering of actions. All events caused by such an action, however, may be handled by the user interface command itself. Screen flow engine 212 may be able to instantiate the needed user interface command and to execute it when receiving an event, without dispatching the event down to the control or the renderer that initially rendered the action. The event could be an HTML abstraction layer event, such as, for example, a HyperText Markup Language-Business (HTMLB) event. To perform mass actions for more than one resource at once, a separate set of user interface commands is needed using their own labels, screen flow, and commands. Mass commands on a framework level may be provided in addition. Mass commands may be inherited in parallel to resource commands from the base command class.

Portion 230, in turn, includes customization controller 232, location parameters 234, personalization data 236, global settings 238, resource properties service 240, and default settings 242. As mentioned previously, portion 230 provides customization of a user interface, and also assists in forming the user interface. In fact, in this embodiment, portion 230 provides customization of the user interface in different extend and on different levels. Some configurations may be valid for the whole company, others may be valid for a user, others may be valid on a folder level, and others may be valid for any other appropriate classifier. Customization controller 232 is responsible for merging settings from configuration sources, location parameters 234, personalization data 236, global settings 238, resource properties service 240, and default settings 242, in the illustrated embodiment. To accomplish this, customization controller 232 may hold several buckets full of key-value pairs, each stemming from the different configuration sources. Then, whenever a request for a parameter arrives, customization controller 232 checks all buckets for entries of this parameter and returns the best fitting one. Resource properties service 240 is responsible for mapping between different characterized resources and properties defined for these resources. In particular embodiments, resource properties service 240 provides a bag of properties for a resource with a certain location, mime type, extension, and/or resource type. In some embodiments, resource properties service 240 may be an Object Type Handler. Location parameters 234 is responsible for returning the address, such as a URL, of a resource. Personalization data 236, global settings 238, and default settings 242 contain information that may be used to configure a user interface.

Browsing and searching functionalities may be carried out with display generator 200. For example, a pane with a screen flow engine 212 is defined as the entry point when displaying a resource. Note that a pane may or may not be rectangular. Screen flow engine 212 uses layout provider 220 to retrieve a valid layout controller 214, which is responsible for the further construction of the user interface. Layout provider 220 may hold several controls to further delegate construction or it can construct all by itself. The contained controls or the layout provider 220 can use collection renderer 216 and resource renderer 218, which are retrieved by renderer provider 222 to construct the user interface. In certain embodiments, screen flow engine 212 does send parameterizations to be used by layout controller 214, collection renderer 216, resource renderer 218, layout provider 220, renderer provider 222, and/or command provider 224, which may again send it to customization controller 232 and in requesting information. The user can customize the user interface by changing the parameters of the configuration sources, location parameters 234, personalization data 236, global settings 238, resource properties service 240, and default settings 242, so that another layout controller and/or renderer is called or by adding new classes that will be returned by layout provider 220, renderer provider 222, and/or command provider 224, which will result in a different construction of the user interface.

The renderer classes know how they want to group the elements they have to render (icons, texts, properties, and actions, for example), but they typically do not know things such as what icon is to be rendered, what set of properties is wanted, and which actions are to be displayed. For icons and properties, the renderer classes may use "dumb" property renderers that return the matching icon or the property of the resource. Of course, if one of the actions of the resource properties service is the type "View", which is normally used as link target when the resource name is rendered, it may be necessary to introduce some kind of distinction between actions that are rendered "within" the resource display and actions that have to be rendered as an "additional link" next to the resource. When screen flow engine 212, layout controller 212, collection renderer 216, and/or resource renderer 218 want to render actions, which are functionality for resources, they use command provider 224, which will receive the valid configuration of the present resource, user role, and/or user viewing interest from customization controller 232. Customization controller 232 uses location parameters 234, personalization data 236, global settings 238, resource properties service 240, and/or default settings 242 to make this determination. Note that resource properties service 240 may return actions defined for a resource, but that the mechanisms of the resource action control may be used because it might be difficult to write large numbers of resource properties service XMLs and modify them every time a new repository service becomes available. The actions may have a user interface command class as attributes. In this case, the renderer class calls the user interface command class with the given resource. The command class returns the link target (including the location of the given resource) that is fired when the user clicks the link or a "False" when the action is not valid for the given resource, caused, for example, by missing permissions. If the renderer class is responsible for rendering a collection of things, it may also ask the commands if they are mass-operation enabled and get an additional target—this time without the attached location. For mass operations, the renderer class may render checkboxes and persist the user selection through multiple clicks and navigations and return this collection if a mass command is fired.

The activation of a link, button, or the like fires an event, which could be an HTMLB event, for example. The class defined within the event, usually the control itself, usually handles the event. A framework event is returned from a control after handling the fired event. The framework event is handled by the screen flow engine to find the next pane to show and to send data to receiving controls. In some embodiments of operation, commands are used to bundle a set of framework actions in a single class, so that controls can carry out multi-stepped actions with a single method call of the command. Commands can also encapsulate error-handling and precondition checks.

The user can customize the user interface by changing the resource properties service entries for the given resource to activate or deactivate actions or change the target class, implementing their own render classes, writing new user interface command classes that work with their services or change the way they work with the inherent services, or implementing their own "dumb" property renderers, which might make it necessary to configure the property renderers loaded by the renderer classes.

As mentioned before, the user interface commands return link targets that should be fired when the user clicks a link. To unbundle rendering and logic, the target links into the user interface command itself, not into the renderer class. The command then carries out the action and returns a framework event or throws an exception, possibly including the translated message. This frees the renderer classes from any "on-click" methods. However, for mass actions, they should be able to return the selected resources. Also, the screen flow engine, or the controls of the layout controller, may listen to user interface command-fired events, instantiates the user interface command, and lets it carry out its action. It may also display the returned exception message. It might be a good idea to have a command manager running, which holds all available commands and returns the command in question or routes the incoming targets to the matching command. This approach would take logic away from the screen flow engine/layout controller and move it towards the package where the command manager and the commands are located.

In certain embodiments, the actions are defined in command provider 224. They may consist of the action name, the label text (possibly translated into a resource property XML file), and the command to call. They could also know if they are mass operation enabled and, if so, offer an additional label text. For the grouping actions, they might belong to action-type categories, such as: 1) "File Operations," with children copy, delete, move, edit, and link, for example; 2) "Collaboration," with children, feedback, discuss, rate, and send to, for example; and 3) "Repository Services," with children state management, tdp, and subscription, for example. The child-parent tree could be defined in an additional XML file. Command provider 224 could then return a collection of action categories that allows a grouping of the actions by the renderer. Another possibility would be to have these children-parent relationships with resource properties service XML files, which would make it more flexible, but require more typing.

The utility classes could be standard. However, they may be static or non-static render methods, and enum-style classes may be used to set the style of the utility class returns, which might lead to no change in display if the utility class does not care about different styles. If everything is rendered through the utility classes, and there is only one utility class to render a certain element, the user can change one class and modify the appearance for all elements rendered by the utility class, possibly requiring a factory for the utility class.

The user can customize the user interface by changing command classes to modify behavior, changing an action category XML to add action to categories, split categories (in "most-wanted actions" or "more actions), or do the same in a resource properties service XML, or modify the utility class renderer to use different icons, text sizes, etc.

This embodiment of the invention has a variety of features. For example, the features discussed for system 100 are available. As another example, the rendering may be determined at runtime rather than at configuration, allowing more dynamic rendering. Moreover, the system allows for dynamically deciding what actions are displayed, forbade, emphasized, and/or de-emphasized for resources. As another example, the user interface may be customizable by a user. For instance, the user can select any of a variety of renderers or associations between resources and/or actions and resource properties. Furthermore, the user interface may be customizable for a user, by altering personalization data 236, for example. As a further example, the separation of logic and layout may allow new services that do not require changes in the coding of the controls. As another example, several layouts with the same functionality may be provided to choose from. As a further example, the hierarchical mechanism may enable customization on different levels, like company wide, administrator level, or user level or resource type, repository wide, or path wide. A variety of other features exist.

System 200 may also provide a consistent user interface by using reusable, combinable rendering objects. This approach also allows the addition of new rendering objects when new elements are added to user roles, user viewing interest, and resource properties. Of course, the same concepts are also applicable when displaying actions that are available for displayed objects. This means that, depending on the user role, user viewing interest, and/or resource properties, a different set of actions may be available to a user.

In other embodiments, portion 210 does not have to include all of the components illustrated for display generator 200. For example, in certain embodiments, layout controller 214 and/or collection renderer 216 may be eliminated, especially where there are not groups of resources to be displayed. As another example, in some embodiments, command provider 224 may be deleted, especially if no actions are associated with resources. In certain embodiments, portion 230 does not have to include all of the components illustrated for display generator 200. For example, one or more of location parameters 234, personalization data 236, global settings 238, resource properties service 240, and/or default settings 242 may be deleted. Of course, portion 210 and portion 230 may include other appropriate components.

Figure 3:
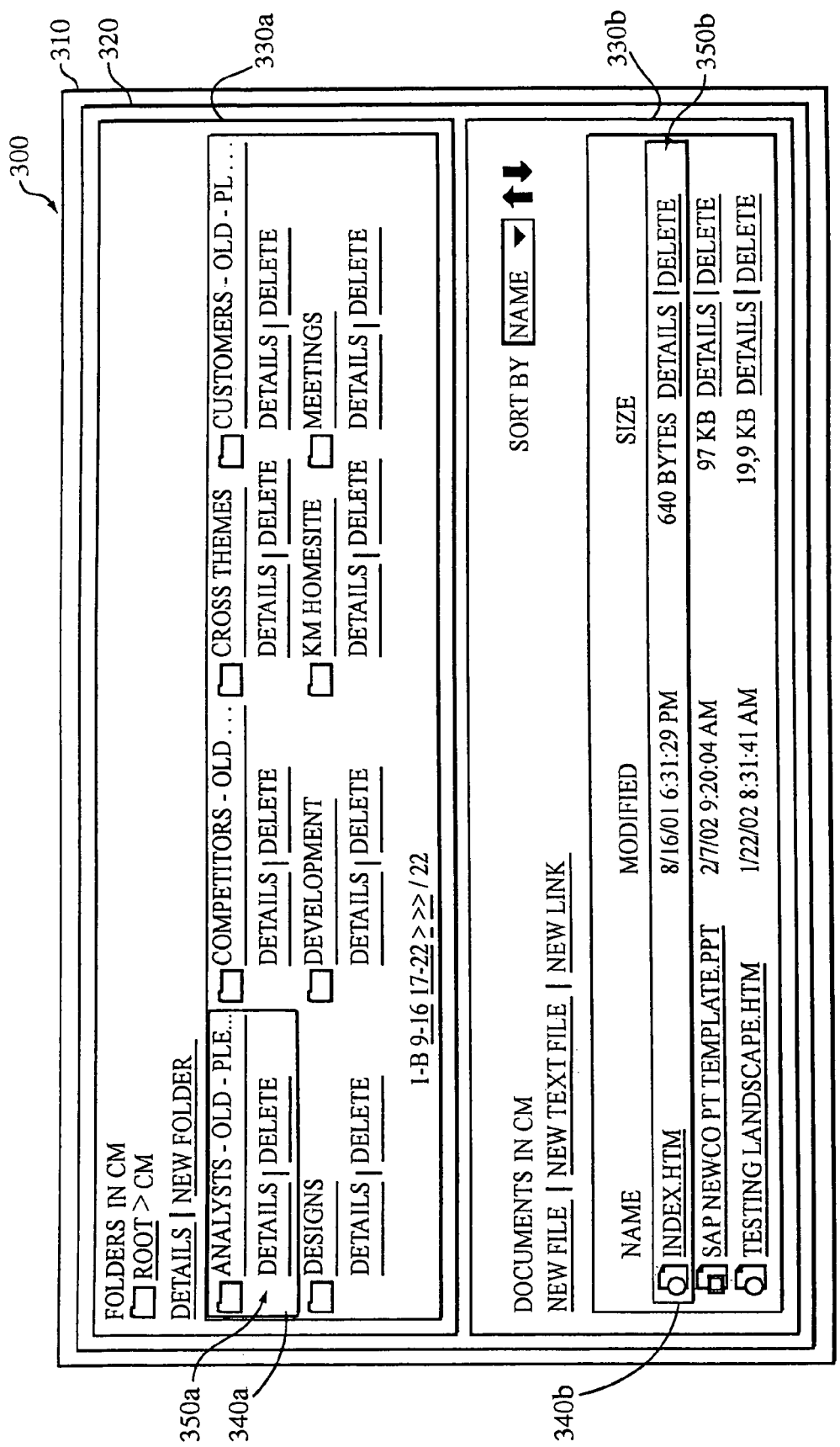
FIG. 3 illustrates one embodiment of a user interface that may be generated by a display generator.

FIG. 3 illustrates one embodiment of a user interface 300 that may be generated by a display generator like display generator 200. As illustrated, user interface 300 contains several sections 310-340, each of which is attributable to a different portion of a display generator. At the periphery is section 310, which is attributable to a screen flow engine and, hence, is a pane for the user interface. Section 320, in turn, is attributable to a layout controller. Note that section 320 has two controls as it has two sections 330. Thus, the associated layout controller is a composite control in this instance. Sections 330 are attributable to collection renderers. Finally, sections 340 are attributable to resource renderers. Note that sections 340, and, hence, the information displayed therein, have actions 350 associated with them. In this embodiment, actions 350 allow more detailed information of the resource to be displayed and deletion of the resource. These actions are determined by a command provider and rendered by the resource renderers.

Although user interface 300 illustrates one embodiment of a user interface that may be generated by a display generator in accordance with the present invention, other embodiments may contain less, more, and/or a different arrangement of information. For example, in certain embodiments, the user interface may not have a composite control. As another example, in some embodiments, the user interface may allow for mass operations. As an additional example, in particular embodiments the user interface may have a different arrangement of resource information. A variety of other examples exist.

FIG. 4 illustrates another embodiment of a user interface 400 that may be generated by a display generator similar to display generator 200. User interface 400 contains several sections 410-440, each of which is attributable to a different portion of a display generator. Section 410 is attributable to a screen flow engine and, hence, is a pane for the user interface. Section 420, in turn, is attributable to a layout controller. Note that section 420 has three controls as it has three sections 430. Thus, the associated layout controller is a composite control in this instance. Section 430a contains a toolbar, with which a user may modify the displayed information, search for different information, and/or perform actions on the displayed information. The toolbar may be generated by any appropriate type of control. The organization of information in sections 430b-c is attributable to collection renderers. Finally, the rendering of the information in sections 440 is attributable to resource renderers. Note that sections 440 have actions 450. In this embodiment, actions 450, which are checkboxes, allow for the selection of the resource information. These actions are determined by a command provider and rendered by the resource renderers. As illustrated, the actions allow for mass operations on the displayed information, note that more than one checkbox may be selected at once. Mass operations may be used to delete, copy, move, and/or otherwise manipulate resource information. Such operations would typically be available to a user in the role of a content manager.

Although user interface 400 illustrates one embodiment of a user interface that may be generated by a display generator in accordance with the present invention, other embodiments may contain fewer, more, and/or a different arrangement of information. For example, in certain embodiments, the user interface may not have a composite control. As another example, in some embodiments, the user interface may not allow mass operations. As an additional example, in certain embodiments, the user interface may not include a toolbar. A variety of other examples exist.

Figure 5:
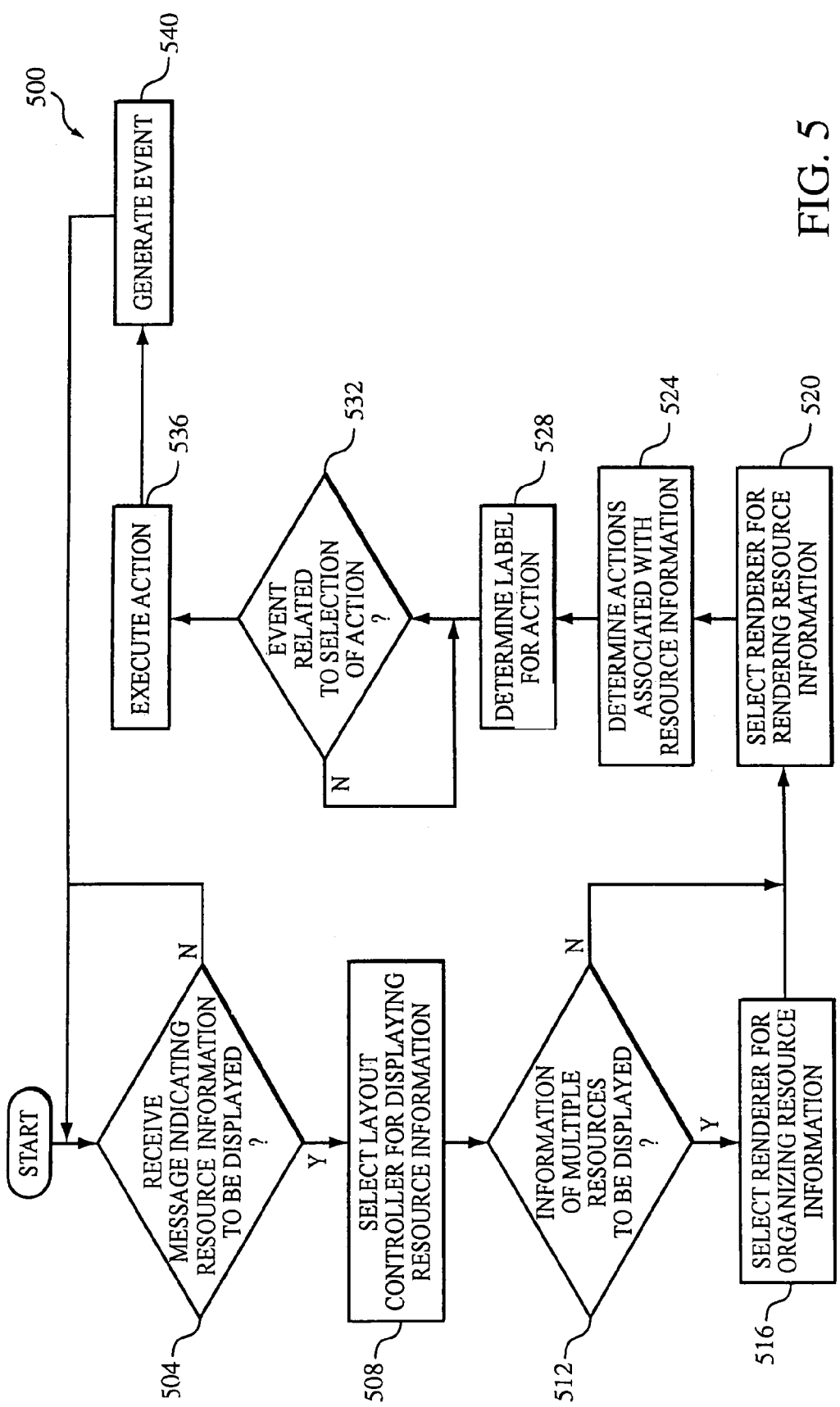
FIG. 5 is a flowchart illustrating a method for managing information display in accordance with one embodiment of the present invention.

FIG. 5 is a flowchart 500 illustrating a method for managing information display in accordance with one embodiment of the present invention. The method begins at decision block 504 with waiting to receive a message indicating that resource information is to be displayed. The message may contain a URL, an event, or any other appropriate indicator of the need to display resource information. The method continues with selecting a layout controller for displaying the resource information at function block 508. This may be accomplished, for example, by evaluating parameters contained in the message, determining settings of a parent resource, requesting class from a resource properties service based on parent resource type, and using default settings from the system configuration. The layout controller may be part of a pool of layout controllers or otherwise.

At decision block 512, the method calls for determining whether information of multiple resources is to be displayed. If information of multiple resources is to be displayed, the method calls for selecting a renderer for organizing the resource information at function block 516. This may be accomplished, for example, by evaluating parameters contained in the message, requesting class from a resource properties service based on a parent resource type, and using default settings from the system configuration. The renderer may be part of a pool of renderers or otherwise.

The method calls for selecting a renderer for rendering resource information at function block 520. This may be accomplished, for example, by evaluating parameters contained in the message, requesting class from a resource properties service based on a parent resource type, and using default settings from the system configuration. Note that a different renderer may be selected for different resource types. The renderer may be part of a pool of renderers or otherwise.

At function block 524, the method calls for determining the actions associated with the resource information. This may be accomplished, for example, by determining a class associated with the resource and evaluating the characteristics of the class. Note that there may be resource information without an associated action. The method continues with determining a label for the action at function block 528. The label could include text, graphics, and/or any other appropriate indicator of an action and could be determined by a command provider.

At decision block 532, the method continues with waiting to detect an event related to selection of an action. Note that the event could be any type of event fired within a system such as system 100 in FIG. 1. Once such a detection occurs, the method calls for executing the action at function block 536. The action could be a command or a series of commands. After executing the action, the method calls for generating an event at function block 540 and returning to function block 504 to wait for a message indicating that resource information is to be displayed. Note that the event itself could be or result in a message indicating that resource information is to be displayed.

Although flowchart 500 illustrates a method for managing information display in accordance with one embodiment of the present invention, other embodiments may include fewer, more, and/or a different arrangement or operations. For example, in certain embodiments, whether or not there are multiple resources to be displayed may not matter because a organizing render is always necessary. As another example, in some embodiments, actions associated with two or more of the resources may be displayed and acted upon. As a further example, in particular embodiments, the method could include the rendering of the resource information and/or action labels. A variety of other example exist.

Figure 6:
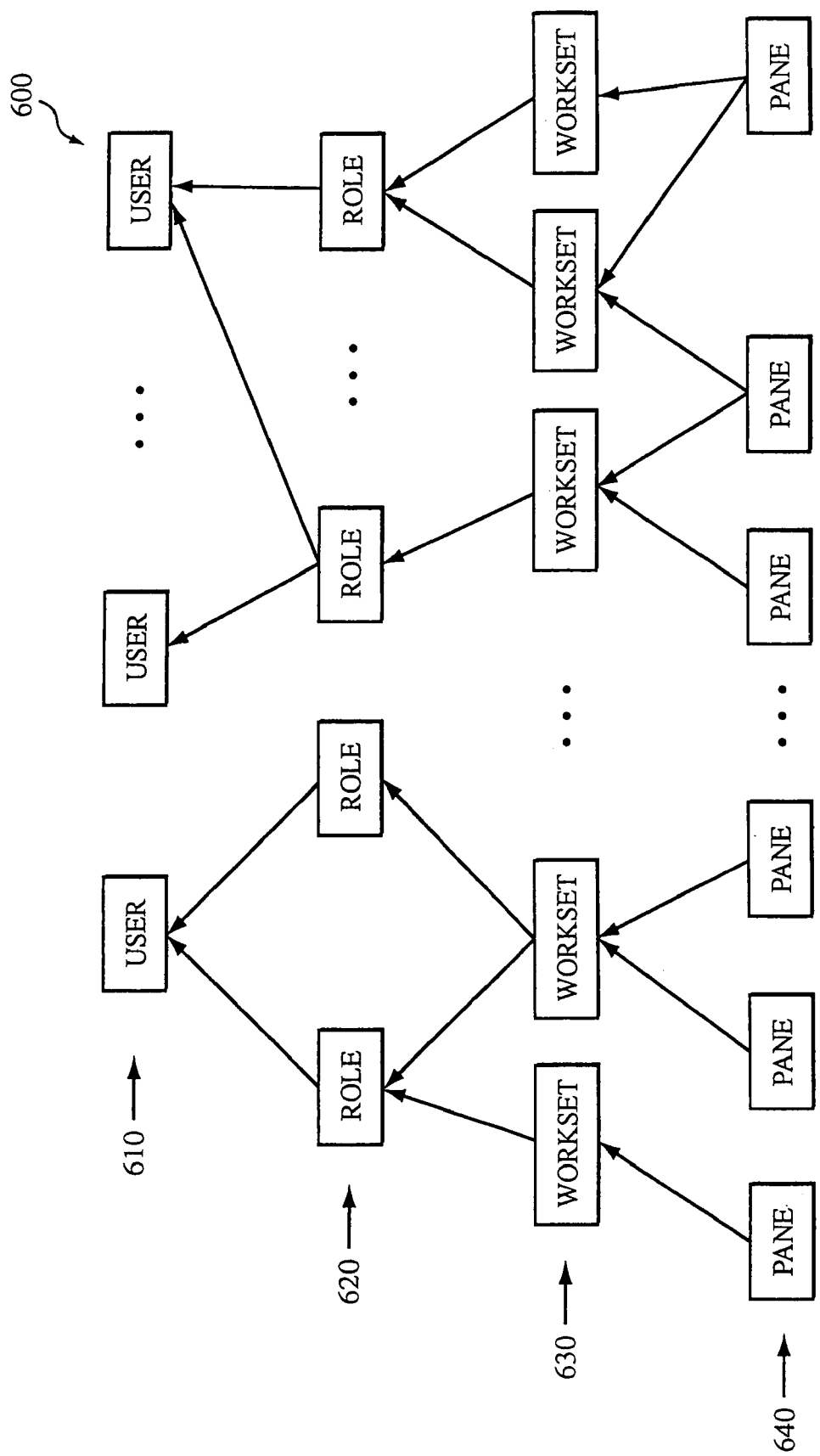
FIG. 6 illustrates a user context architecture for managing information display.

FIG. 6 illustrates a user context architecture 600 for managing information display. As illustrated, architecture 600 includes four levels 610-640. Users for a system are defined at level 610, and roles for the users are defined at level 620. A role for a user may be administrator, content provider, content analyzer, or any other appropriate assignment in an electronic data storage system. Note that a user may have more than one role and that a role may be associated with more than one user. Worksets for the roles are defined at level 630, and panes for the worksets are defined at level 640. Panes are the portions used to make up a user interface, and the worksets are a collection of panes. Note that a role may have more than one workset and that a workset may be associated with more than one role. Furthermore, note that a workset may have more than one pane and that an pane may be associated with more than one workset.

Using architecture 600, the user interface presented to a user will vary depending on the role of the user. Thus, the user's role will dictate, at least to some degree, the information that will be presented to the user. Note that some information may be presented in multiple roles.

In some embodiments, a pane may be an intermediate view (iView) from SAP. An iView is a self-contained, XML-based presentation element with a well-defined set of interfaces responsible for displaying its content and the personalization of the content elements presented as part of a portal page. IViews may provide awareness of events and enable the rapid creation of information building blocks from organization applications. iViews may receive information from structured or unstructured applications using Object Linking and Embedding Database (OLE DB), native application programming interfaces (APIs), HyperText Transfer Protocol (HTTP), Extensible Markup Language (XML), Simple Object Access Protocol (SOAP), and the like, and may generate XML-based output. Furthermore, iViews may deliver Web service information by connecting to Web services through the Universal Discovery, Description, and Integration (UDDI), which will allow the Web service to be exposed, by receiving information through Web Services Description Language (WSDL), and by delivering views as SOAP-compliant objects.

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a backend component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such backend, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While several embodiments have been described in detail above, other modifications are possible. Portions of this disclosure discuss managing information display. In particular, portions of the disclosure relate to dynamically determining information display in server structures. However, these techniques could be used in any type of resource management systems.

Other embodiments may be within the scope of the following claims.

What is claimed is:

1. A method comprising:
   forming a user interface for displaying a resource information of a resource by defining a pane in which to display the resource information;
   evaluating a property of the resource and a current user context of the user interface;
   identifying a resource class with which the resource is associated, the identifying comprising:
      evaluating at least one of a plurality of parameters contained in a message indicating that the resource information is to be displayed,
      examining a parent resource type of the resource, and using at least one of a plurality of default system settings; and
   selecting, from a plurality of renderers, a renderer operable to render the resource information in the pane, the selecting being based at least in part on the property, the current user context, and the identified resource class;
   wherein at least one of the forming, the evaluating, the identifying, and the selecting are implemented on at least one processor.

2. The method of claim 1, wherein the resource comprises at least one electronic document, and wherein evaluating the property of the resource comprises evaluating a location of the resource in a resource hierarchy.

3. The method of claim 1, wherein evaluating the current user context comprises evaluating a user role and a user viewing interest, wherein the user viewing interest includes modifying resource content.

4. The method of claim 1, wherein evaluating the current user context comprises evaluating in order of priority the at least one of the plurality of parameters to identify the resource class.

5. The method of claim 1, wherein forming the user interface further comprises selecting a controller operable to define a layout for organizing navigation.

6. The method of claim 5, wherein selecting the controller comprises the evaluating of the property of the resources and the current user context.

7. The method of claim 6, wherein the evaluating of the property of the resource and the user context comprises associating the resource with the resource class, which specifies the property of the resource.

8. The method of claim 7, wherein associating the resource with the resource class comprises, in order of priority:
   evaluating parameters contained in the message to identify the resource class;
   analyzing settings of a parent resource to identify the resource class;
   examining the parent resource type to identify the resource class; and
   using default system settings to identify the resource class.

9. The method of claim 1, wherein forming the user interface further comprises selecting an organizing renderer for organizing the pane.

10. The method of claim 1, further comprising modifying characteristics associated with the resource, wherein the user interface is altered by the modification.

11. The method of claim 10, wherein the user interface is altered by having a different renderer selected to render the resource information in the pane.

12. The method of claim 1, further comprising:
   determining whether the resource has an associated action;
   determining, if the resource has an associated action, a label for the action; and
   rendering the label.

13. The method of claim 12, wherein the label comprises a link, a button, or a hover menu.

14. The method of claim 12, further comprising:
   detecting an event related to selection of the action; and
   mapping the event to a command to perform the action.

15. The method of claim 12, further comprising generating a new message to display information of a resource when the action has been completed.

16. The method of claim 12, further comprising modifying the association between actions and resources so that the associated action is altered.

17. A system comprising:
   a screen flow engine operable to receive a message indicating that resource information of a resource is to be displayed and to define, within a user interface, a pane in which to display the resource information; and
   a renderer provider operable to perform functions comprising:
      evaluating a property of the resource and a current user context of the user interface;
      identifying a resource class with which the resource is associated, the identifying comprising:
         evaluating at least one of a plurality of parameters contained in a message indicating that the resource information is to be displayed,
         examining a parent resource type of the resource, and using at least one of a plurality of default system settings; and selecting, from a plurality of renderers, a renderer operable to render the resource information in the pane, the selecting being based at least in part on the property of the resource, the current user context, and the identified resource class;

wherein at least one of the screen flow engine, the renderer provider, and the renderer are implemented on at least one processor.

18. An article comprising a non-transitory machine readable medium storing instructions operable to cause one or more machines to perform operations comprising:

forming a user interface for displaying a resource information of a resource by defining a pane in which to display the resource information;

evaluating a property of the resource and a current user context of the user interface;

identifying a resource class with which the resource is associated, the identifying comprising:

evaluating at least one of a plurality of parameters contained in a message indicating that the resource information is to be displayed, examining a parent resource type of the resource, and using at least one of a plurality of default system settings; and selecting, from a plurality of renderers, a renderer operable to render the resource information in the pane, the selecting being based at least in part on the property, the current user context, and the identified resource class;

wherein at least one of the forming, the evaluating, the identifying, and the selecting are implemented on at least one processor.

19. The article of claim 18, wherein evaluating the property of the resource comprises evaluating the location of the resource in a resource hierarchy.

20. The article of claim 19, wherein evaluating the current user context comprises evaluating a user role and a user viewing interest.

* * * * *